US010885218B2

(12) United States Patent
Li et al.

(10) Patent No.: US 10,885,218 B2
(45) Date of Patent: Jan. 5, 2021

(54) PRIVACY PROTECTION METHOD AND TERMINAL DEVICE

(71) Applicant: Huawei Technologies Co., Ltd., Shenzhen (CN)

(72) Inventors: Zijun Li, Shenzhen (CN); Jingyu Lai, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 15/300,722

(22) PCT Filed: Mar. 31, 2014

(86) PCT No.: PCT/CN2014/074431
§ 371 (c)(1),
(2) Date: Sep. 29, 2016

(87) PCT Pub. No.: WO2015/149235
PCT Pub. Date: Oct. 8, 2015

(65) Prior Publication Data
US 2017/0109543 A1    Apr. 20, 2017

(51) Int. Cl.
*G06F 21/62* (2013.01)
*H04W 12/02* (2009.01)

(52) U.S. Cl.
CPC .......... *G06F 21/6245* (2013.01); *H04W 12/02* (2013.01)

(58) Field of Classification Search
None
See application file for complete search history.

(56) References Cited

U.S. PATENT DOCUMENTS

| 8,504,842 B1* | 8/2013 | Meacham | G06F 3/0488 |
| | | | 713/182 |
| 8,694,791 B1* | 4/2014 | Rohrweck | G06F 21/36 |
| | | | 455/418 |
| 9,052,753 B2* | 6/2015 | Hong | G06F 3/0488 |
| 9,372,970 B2* | 6/2016 | Casey | G06F 21/31 |
| 9,430,634 B1* | 8/2016 | Dotan | H04L 63/083 |
| 9,626,499 B2* | 4/2017 | Kuscher | G06F 21/36 |

(Continued)

FOREIGN PATENT DOCUMENTS

| CN | 101778152 A | 7/2010 |
| CN | 101894232 A | 11/2010 |

(Continued)

*Primary Examiner* — Benjamin E Lanier
(74) *Attorney, Agent, or Firm* — Leydig, Voit & Mayer, Ltd.

(57) ABSTRACT

Embodiments of the present invention disclose a privacy protection method, a mode switching apparatus, and a terminal device. The method includes: receiving an input operation of a user; identifying the input operation and extracting an action feature; performing matching in an instruction library according to the action feature, and when the matching succeeds, generating instruction information corresponding to the action feature; determining a protection mode of the terminal device according to the instruction information, and determining an application that subscribes to the protection mode in the terminal device; and controlling display of the application according to the protection mode of the terminal device.

18 Claims, 5 Drawing Sheets

(56) References Cited

U.S. PATENT DOCUMENTS

| | | | |
|---|---|---|---|
| 9,710,632 B2* | 7/2017 | Lymberopoulos | G06F 21/32 |
| 9,830,439 B2* | 11/2017 | Vaughn | G06F 21/316 |
| 9,921,741 B2* | 3/2018 | Liu | G06F 3/0488 |
| 2010/0031320 A1* | 2/2010 | Bhesania | G06F 21/83 726/4 |
| 2011/0251954 A1* | 10/2011 | Chin | G06F 3/04883 705/40 |
| 2012/0102559 A1 | 4/2012 | Yoshida | |
| 2012/0131471 A1 | 5/2012 | Terlouw et al. | |
| 2014/0013417 A1* | 1/2014 | Sakai | G06F 3/005 726/16 |
| 2014/0085460 A1 | 3/2014 | Park et al. | |
| 2014/0101777 A1* | 4/2014 | Kim | G06F 21/62 726/27 |
| 2014/0109018 A1* | 4/2014 | Casey | G06F 3/04895 715/863 |
| 2014/0143860 A1* | 5/2014 | Druckman | G06F 21/32 726/19 |
| 2014/0283142 A1* | 9/2014 | Shepherd | G06F 3/0482 726/30 |
| 2014/0295795 A1* | 10/2014 | Miyazaki | H04W 12/06 455/411 |
| 2014/0310805 A1* | 10/2014 | Kandekar | G06F 21/36 726/19 |
| 2014/0317723 A1* | 10/2014 | Hicks | G06F 21/36 726/19 |
| 2014/0317724 A1* | 10/2014 | Hicks | G06F 21/36 726/19 |
| 2015/0033328 A1* | 1/2015 | Watanabe | G06F 3/017 726/19 |
| 2015/0045000 A1* | 2/2015 | Kim | G06F 3/0488 455/411 |
| 2015/0089634 A1* | 3/2015 | DeLuca | G06F 3/0488 726/19 |
| 2015/0089666 A1* | 3/2015 | Lee | G06F 21/53 726/27 |
| 2015/0128255 A1* | 5/2015 | Kuscher | G06F 3/16 726/19 |
| 2015/0213244 A1* | 7/2015 | Lymberopoulos | G06F 21/32 726/18 |
| 2015/0254464 A1* | 9/2015 | Shah | H04W 12/04 726/18 |
| 2015/0261406 A1* | 9/2015 | Nie | G06F 3/0484 715/863 |
| 2016/0055330 A1* | 2/2016 | Morishita | G06F 21/36 726/19 |
| 2016/0110013 A1* | 4/2016 | Yu | G06F 3/0416 345/173 |
| 2016/0283710 A1* | 9/2016 | Kwon | G06F 3/04883 |
| 2016/0371479 A1* | 12/2016 | Wynen | G06F 3/0488 |
| 2017/0004294 A1* | 1/2017 | Agrawal | G10L 17/24 |
| 2017/0010797 A1* | 1/2017 | Lee | G06F 3/017 |
| 2017/0177851 A1* | 6/2017 | Sawant | G06F 21/36 |

FOREIGN PATENT DOCUMENTS

| | | |
|---|---|---|
| CN | 102413221 A | 4/2012 |
| CN | 102707890 A | 10/2012 |
| CN | 102902935 A | 1/2013 |
| CN | 103019530 A | 4/2013 |
| CN | 103049704 A | 4/2013 |
| CN | 103136479 A | 6/2013 |
| CN | 103139353 A | 6/2013 |
| CN | 103399632 A | 11/2013 |
| CN | 103473494 A | 12/2013 |
| CN | 103577733 A | 2/2014 |
| CN | 103616986 A | 3/2014 |
| CN | 103617382 A | 3/2014 |

* cited by examiner

PRIVACY PROTECTION METHOD AND TERMINAL DEVICE

CROSS-REFERENCE TO RELATED APPLICATIONS

This application is a National Stage of International Application No. PCT/CN2014/074431, filed on Mar. 31, 2014, which is hereby incorporated by reference in its entirety.

TECHNICAL FIELD

The present invention relates to the field of communications technologies, and in particular, to a privacy protection method and a terminal device.

BACKGROUND

Currently, intelligent terminals have more functions, various applications can be installed in the intelligent terminals, and the intelligent terminals can access a network and store a large amount of data. In actual application, a user may operate some privacy content on a terminal, and does not expect that other people see the privacy content when they use the terminal. The content is, for example, some stored photos, records of accessed websites, some contacts in an address book, and friend information or communication records in an instant messenger. When the terminal is used by another person, the owner of the terminal expects that privacy information is hidden, and if the owner of the terminal uses the terminal by himself/herself, the privacy information may be presented.

Currently, a function, applied to a terminal device, for hiding information is developed in the industry, and a scope of the function includes hiding a particular contact and all information associated with the contact in a mobile phone, such as call records, short message service messages, emails, and schedules. The user sets a status of content of an application in the application, for example, when the user sets a particular contact to a private contact, information of the contact is not displayed, and can be viewed only after a preset password is input for entering a private mode.

If the user wants to manage private information in another application, the privacy management function needs to be implemented again in the application. In particular, functions of entering a privacy protection state and cancelling a privacy protection state need to be managed separately for each application, and consequently, operations are complex. Therefore, an application scope of the prior art is relatively small, and cannot satisfy privacy protection requirements of the user for more applications.

SUMMARY

Embodiments of the present invention provide a privacy protection method and a terminal device, so that a user can conveniently switch the terminal device between a protection mode and an ordinary mode, and the terminal device autonomously notifies, according to the switched protection mode, an application to select to hide or display content having a privacy attribute in the application on the terminal device, and therefore, the user can conveniently select the protection mode of the terminal device in different use environments, to perform privacy protection.

According to a first aspect, an embodiment of the present invention provides a privacy protection method, including:

receiving an input operation of a user;

identifying the input operation and extracting an action feature;

performing matching in an instruction library according to the action feature, and when the matching succeeds, obtaining instruction information corresponding to the action feature;

determining a protection mode of the terminal device according to the instruction information, and determining an application that subscribes to the protection mode in the terminal device; and controlling display of the application according to the protection mode of the terminal device.

In a first possible implementation manner, the instruction information includes: instruction information of entering a privacy protection mode or instruction information of entering an ordinary mode; before the receiving an input operation of a user, the method further includes:

presetting, in the instruction library, a correspondence between the action feature and the instruction information of entering a privacy protection mode, or presetting, in the instruction library, a correspondence between the action feature and the instruction information of entering an ordinary mode.

With reference to the first possible implementation manner of the first aspect, in a second possible implementation manner, the presetting, in the instruction library, a correspondence between the action feature and the instruction information of entering a privacy protection mode specifically includes:

receiving, by the terminal device, a configuration setting instruction that is input by the user for entering a protection mode;

receiving a first input operation of the user;

extracting an action feature of the first input operation;

displaying the action feature of the first input operation, and sending confirmation prompt information to the user;

receiving confirmation information from the user; and presetting, in the instruction library, a correspondence between the action feature of the first input operation and the protection mode.

With reference to the first possible implementation manner of the first aspect, in a third possible implementation manner, the presetting, in the instruction library, a correspondence between the action feature and the instruction information of entering an ordinary mode includes:

receiving, by the terminal device, a configuration setting instruction that is input by the user for entering an ordinary mode;

receiving a second input operation of the user;

extracting an action feature of the second input operation;

displaying the action feature of the second input operation, and sending confirmation prompt information to the user;

receiving confirmation information from the user; and presetting, in the instruction library, a correspondence between the action feature of the second input operation and the ordinary mode.

In a fourth possible implementation manner, before the receiving an input operation of a user, the method further includes:

receiving a protection mode switch triggering instruction input by the user, and starting monitoring the input operation of the user.

With reference to the first aspect or the first, second, third, or fourth possible implementation manner of the first aspect, in a fifth possible implementation manner, the method further includes:

receiving a privacy attribute setting instruction; and setting a privacy attribute of a part or all of content of the application according to the privacy attribute setting instruction.

With reference to the fifth possible implementation manner of the first aspect, in a sixth possible implementation manner, the controlling display of the application according to the protection mode of the terminal device is specifically:

hiding or displaying, on the terminal device according to the protection mode of the terminal device, the part or all of the content in the application, where the privacy attribute of the part or all of the content is already set.

With reference to the first aspect or the first, second, third, fourth, fifth, or sixth possible implementation manner of the first aspect, in a seventh possible implementation manner, the method further includes: when the matching succeeds, generating prompt information, where the prompt information is used to prompt the user that the terminal device successfully identifies the input operation and will switch to a protection mode.

According to a second aspect, an embodiment of the present invention provides a mode switching apparatus, including:

a first receiving unit, configured to receive an input operation of a user; an analysis unit, configured to identify the input operation and extract an action feature;

a matching unit, configured to perform matching in an instruction library according to the action feature, and when the matching succeeds, obtain instruction information corresponding to the action feature;

a determining unit, configured to determine a protection mode of the apparatus according to the instruction information, and determine an application that subscribes to the protection mode in the apparatus; and a processing unit, configured to control display of the application according to the protection mode of the apparatus.

In a first possible implementation manner, the instruction information includes: instruction information of entering a privacy protection mode or instruction information of entering an ordinary mode; and the apparatus further includes: an action management unit, configured to preset, in the instruction library, a correspondence between the action feature and the instruction information of entering a privacy protection mode, or preset, in the instruction library, a correspondence between the action feature and the instruction information of entering an ordinary mode.

In a second possible implementation manner, the apparatus further includes: a second receiving unit, configured to receive a protection mode switch triggering instruction input by the user, and start monitoring the input operation of the user.

With reference to the second aspect or the first or second possible implementation manner of the second aspect, in a third possible implementation manner, the apparatus further includes a privacy attribute management unit, configured to receive a privacy attribute setting instruction, and set a privacy attribute of a part or all of content in the application according to the privacy attribute setting instruction.

In a fourth possible implementation manner, the processing unit is specifically configured to:

hide or display, on the apparatus according to the protection mode of the apparatus, the part or all of the content in the application, where the privacy attribute of the part or all of the content is already set.

With reference to the second aspect or the first, second, third, or fourth possible implementation manner of the second aspect, in a fifth possible implementation manner, the processing unit is further configured to: when the matching succeeds, generate prompt information, where the prompt information is used to prompt the user that the identification on the input operation by the apparatus succeeds and the apparatus will perform a protection mode switch.

According to a third aspect, an embodiment of the present invention provides a terminal device, including:

a processor;
a memory;
a sensor;
a touch screen; and an application physically stored in the memory, where the application includes an instruction that can be used to enable the processor to execute the following process:

receiving an input operation of a user;

identifying the input operation and extracting an action feature;

performing matching in an instruction library according to the action feature, and when the matching succeeds, generating instruction information corresponding to the action feature;

determining a protection mode of the terminal device according to the instruction information, and determining an application that subscribes to the protection mode in the terminal device; and controlling display of the application according to the protection mode of the terminal device.

In a first possible implementation manner, the instruction information includes: instruction information of entering a privacy protection mode or instruction information of entering an ordinary mode; the application further includes an instruction that can be used to enable the processor to execute the following process before the input operation of the user is received:

presetting, in the instruction library, a correspondence between the action feature and the instruction information of entering a privacy protection mode, or presetting, in the instruction library, a correspondence between the action feature and the instruction information of entering an ordinary mode.

With reference to the third aspect or the first possible implementation manner of the third aspect, in a second possible implementation manner, the instruction, which can be used to preset, in the instruction library, a correspondence between the action feature and the instruction information of entering a privacy protection mode, in the application is:

receiving, by the terminal device, a configuration setting instruction that is input by the user for entering a protection mode;

receiving a first input operation of the user;

extracting an action feature of the first input operation;

displaying the action feature of the first input operation, and sending confirmation prompt information to the user;

receiving confirmation information from the user; and presetting, in the instruction library, a correspondence between the action feature of the first input operation and the protection mode.

With reference to the third aspect or the first possible implementation manner of the third aspect, in a third possible implementation manner, the instruction, which can be used to preset, in the instruction library, a correspondence between the action feature and the instruction information of entering an ordinary mode, in the application is:

receiving, by the terminal device, a configuration setting instruction that is input by the user for entering an ordinary mode;

receiving a second input operation of the user;

extracting an action feature of the second input operation;

displaying the action feature of the second input operation, and sending confirmation prompt information to the user;

receiving confirmation information from the user; and presetting, in the instruction library, a correspondence between the action feature of the second input operation and the ordinary mode.

In a fourth possible implementation manner, the application further includes an instruction that can be used to enable the processor to execute the following process before the input operation of the user is received:

receiving a protection mode switch triggering instruction input by the user, and starting monitoring the input operation of the user.

With reference to the third aspect or the first, second, third, or fourth possible implementation manner of the third aspect, in a fifth possible implementation manner, the application further includes an instruction that can be used to enable the processor to execute the following process:

receiving a privacy attribute setting instruction; and setting a privacy attribute of a part or all of content of the application according to the privacy attribute setting instruction.

With reference to the third aspect or the fifth possible implementation manner of the third aspect, in a sixth possible implementation manner, an instruction, which can be used to control the display of the application according to the protection mode of the terminal device, in the application is:

hiding or displaying, on the terminal device according to the protection mode of the terminal device, the part or all of the content in the application, where the privacy attribute of the part or all of the content is already set.

With reference to the third aspect or the first, second, third, fourth, fifth, or sixth possible implementation manner of the third aspect, in a seventh possible implementation manner, the application further includes an instruction that can be used to enable the processor to execute the following process:

when the matching succeeds, generating prompt information, where the prompt information is used to prompt the user that the terminal device successfully identifies the input operation and will switch to a protection mode.

In the privacy protection method and the terminal device in the embodiments of the present invention, a user conveniently switches the terminal device between a protection mode and an ordinary mode, and an application is notified, according to the switched protection mode of the terminal device, to select to hide or display content having a privacy attribute in the application on the terminal device, so that the user can conveniently select the protection mode of the terminal device in different use environments, to perform privacy protection.

The technical solutions of the embodiments of the present invention are further described in detail in the following by using accompany drawings and embodiments.

DESCRIPTION OF EMBODIMENTS

The following describes the embodiments of the present invention in detail with reference to accompanying drawings. It should be clear that the described embodiments are only a part rather than all of the embodiments of the present invention. All other embodiments obtained by a person of ordinary skill in the art based on the embodiments of the present invention without creative efforts shall fall within the protection scope of the present invention.

Figure 1:
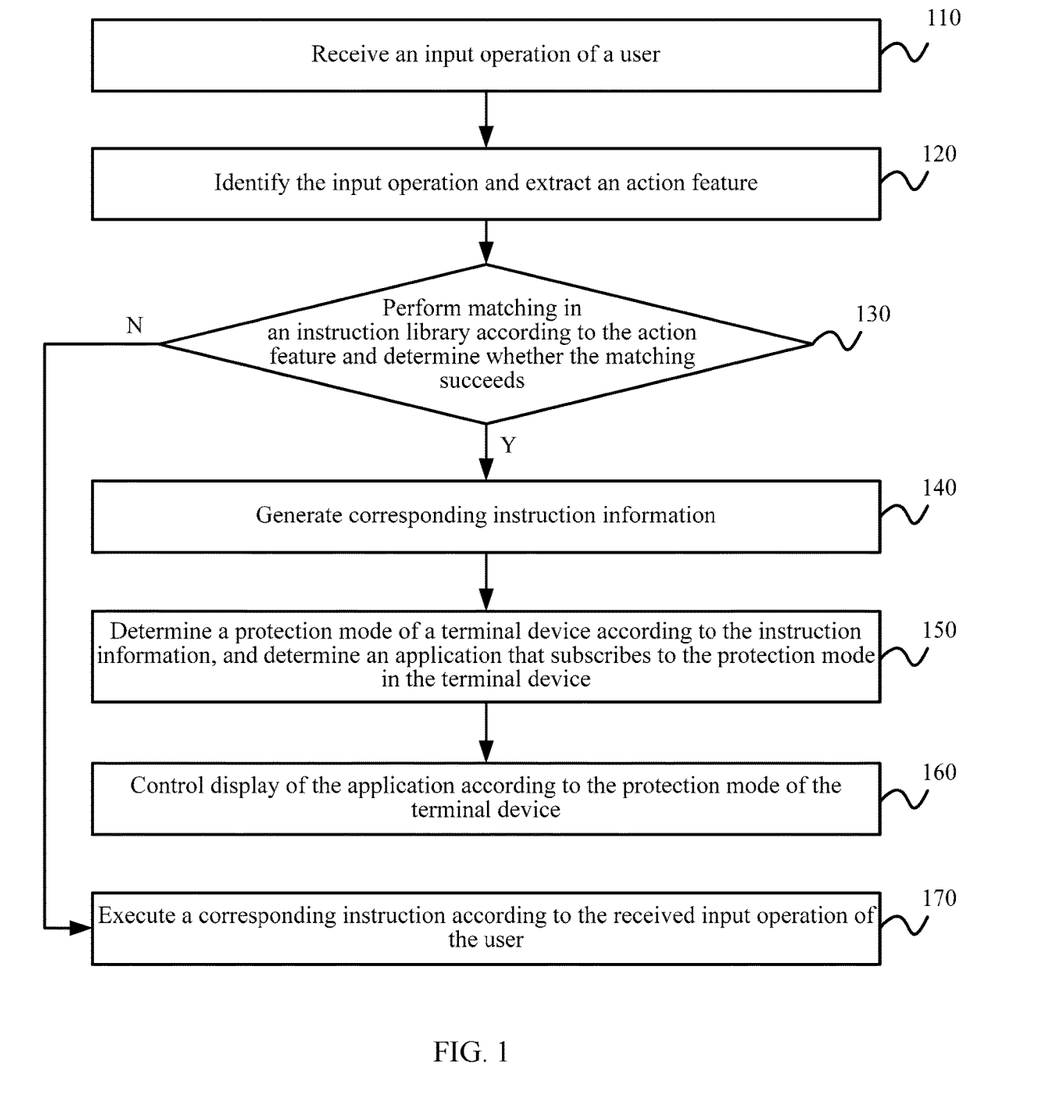
FIG. 1 is a flowchart of a privacy protection method according to an embodiment of the present invention.

FIG. 1 is a flowchart of a privacy protection method according to Embodiment 1 of the present invention. As shown in FIG. 1, the privacy protection method includes the following steps:

Step 110: Receive an input operation of a user.

Specifically, the input operation may include: an operation of changing a position or an angle of a terminal device, an operation of changing a posture or force for holding a terminal device, an operation of enabling a terminal device to receive a specific voice or image, or the like.

For example, the input operation may be an action input such as "a horizontal screen-a vertical screen-a horizontal screen", "shaking twice", or "continuously flapping twice".

Step 120: Identify the input operation and extract an action feature.

Specifically, a terminal device identifies the received input operation, and extracts the action feature of the input operation of the user through analysis.

Step 130: Perform matching in an instruction library according to the action feature.

Specifically, a correspondence between the action feature and a protection mode and a correspondence between the action feature and an ordinary mode are prestored in the instruction library. Matching is performed in the instruction library according to the action feature that is extracted from the input operation of the user.

Step 140: When the matching succeeds, generate corresponding instruction information.

Specifically, the instruction information includes: instruction information of entering a privacy protection mode or instruction information of entering an ordinary mode; if the action feature that is extracted from the input operation of the user is the same as the stored action feature corresponding to the protection mode, the instruction information of entering a privacy protection mode is generated; if the action feature that is extracted from the input operation of the user is the same as the stored action feature corresponding to the ordinary mode, the instruction information of entering an ordinary mode is generated.

Optionally, when the matching succeeds, the terminal device may further generate prompt information and prompt the user, and a prompt manner may be, for example, vibrating, voice, or display. The prompt information is used to prompt the user that the terminal device successfully identifies the input operation and will switch to a protection mode.

Step 150: Determine a protection mode of the terminal device according to the instruction information, and determine an application that subscribes to the protection mode in the terminal device.

Specifically, the protection mode of the terminal device is determined according to the instruction information obtained in the previous step, where the protection mode includes a privacy protection mode and an ordinary mode. The terminal device hides or displays, on the terminal device according to the protection mode of the device, a part or all of content in the application, where a privacy attribute of the part or all of the content is already set.

Further, an operating system of the terminal device provides a notification mechanism. A processor of the terminal device includes a privacy management service control module. The application stored in the terminal device may actively send a subscription request to the operating system to subscribe to a privacy management service notification, where the subscription request sent by the application to the operating system carries an identifier of the application. In this way, when the protection mode of the terminal device changes, a notification that the protection mode changes is sent, by using the privacy management service control module of the processor, to the application that subscribes to the notification, thereby implementing a privacy management service of the terminal device. An application that does not subscribe to the notification does not receive the notification when the protection mode changes. The application that subscribes to the notification may obtain the protection mode of the terminal device in two manners. The two manners are respectively as follows:

One manner is described in this embodiment, the application is already started, and when the user makes an action of switching the protection mode, the privacy management service is triggered to send a notification to the application.

The other manner is: When the application is started, the application queries a current protection mode from the privacy management service.

Step 160: Control display of the application according to the protection mode of the terminal device.

Specifically, the notification may include a name or an identifier of a new state; or include only a notification that the protection mode changes, and then, the application receiving the notification queries actively whether the terminal device is currently in a privacy protection mode or an ordinary mode.

The application selects a display manner of content of the application according to the current protection mode of the terminal device. In the privacy protection mode, content whose attribute is set to privacy protection is hidden, and the rest content is displayed to the user for viewing. In the ordinary mode, all content of the application is displayed to the user for viewing.

Optionally, before step 110, the method further includes: receiving, by the terminal device, a protection mode switch triggering signal, and starting monitoring the input operation of the user.

Specifically, when the user needs to enter a privacy protection mode, the user first needs to start a corresponding setting or service on the terminal device, to monitor the input operation of the user, so as to determine whether the user has permission to enter the privacy protection mode.

After the terminal device receives an operation instruction of the user, the terminal device converts the operation instruction into a privacy protection mode switch triggering signal and starts monitoring the input operation of the user.

In addition, when the matching does not succeed, the terminal device executes step 170, and executes a corresponding instruction according to the received input operation of the user.

Optionally, when the user needs to switch from the privacy protection mode to the ordinary mode, the corresponding setting or service on the terminal device may be started, and the terminal device determines, according to the operation instruction that is input by the user, to enter the ordinary mode.

In the privacy protection method provided in Embodiment 1 of the present invention, a user conveniently switches the terminal device between a privacy protection mode and an ordinary mode, and the terminal device autonomously notifies, according to the switched protection mode, an application to select to hide or display content having a privacy attribute in the application on the terminal device, so that the user can conveniently select the protection mode of the terminal device in different use environments, to perform privacy protection.

As can be known according to the foregoing Embodiment 1, matching needs to be performed in an instruction library according to an action feature extracted according to an input operation of a user, and instruction information corresponding to the input operation of the user is obtained. Therefore, before the method provided in Embodiment 1 of the present invention is used to perform privacy protection, the instruction library first needs to be configured, that is, a correspondence between the action feature and instruction information of entering a protection mode and a correspondence between the action feature and instruction information of entering an ordinary mode are preset in the instruction library.

An instruction library configuration process may be implemented by using a presetting method provided in the following embodiment.

Figure 2:
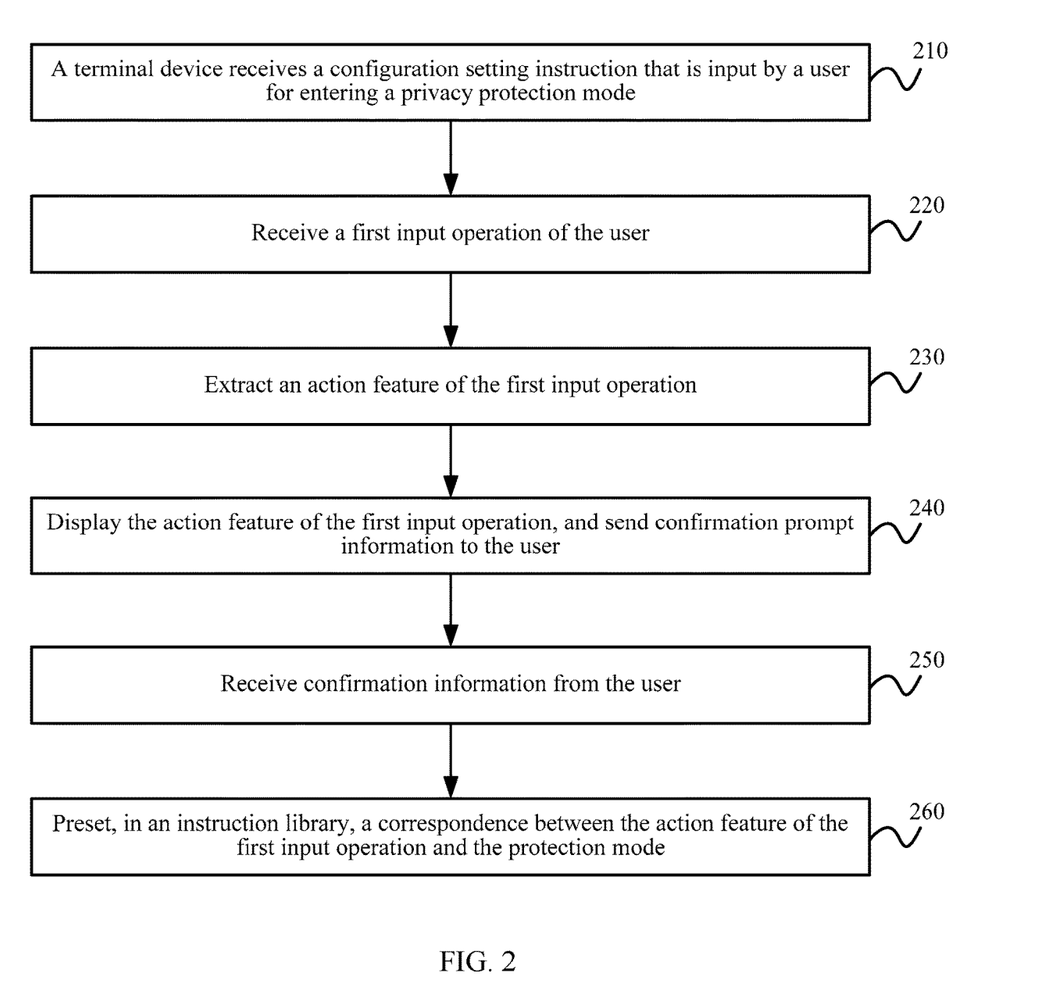
FIG. 2 is a flowchart of an instruction library presetting method according to an embodiment of the present invention.

FIG. 2 is a flowchart of an instruction library presetting method according to an embodiment of the present invention, and the method is used to preset a correspondence between an action feature and a privacy protection mode in the instruction library, and specifically includes the following steps:

Step 210: The terminal device receives a configuration setting instruction that is input by a user for entering a privacy protection mode.

Specifically, when the instruction library is configured, a working mode of the terminal device that is currently to be configured needs to be specified. In this embodiment, a protection mode of the terminal device is configured. The user uses the terminal and performs an input operation on the terminal device, and the terminal device generates, according to the input operation of the user, a configuration setting instruction for entering a privacy protection mode.

Step 220: Receive a first input operation of the user.

Specifically, the terminal device is provided with various built-in sensors, and various actions with unique features may be detected by using the various built-in sensors. For example, a gravity sensor may detect whether the terminal device is in a horizontal screen mode or a vertical screen mode, an acceleration sensor may detect a moving track of the terminal device, and a ray sensor may detect whether there is a blocking object. Therefore, the first input operation of the user that may be received by the terminal device may include: an operation of changing a position or an angle of the terminal device, or the like. In addition, the first input operation may be an input operation of using more sensors such as a microphone and a camera, an operation of changing a posture or force for holding the terminal device, or the like.

To improve effective identification on the input operation of the user, the terminal device may display, according to a sensor type supported by the terminal device, some input prompt to the user, for example, display descriptions of some action examples in a form of a list, so as to guide the user to make suitable actions. To enhance an impression of the user for an input action, the user may be required to input actions for multiple times; if the actions that are input for multiple times are the same, it is considered that the user can exactly make this action, and the action is then used as an input for following processing.

Step 230: Extract an action feature of the first input operation.

Specifically, the terminal device analyzes the received first input operation, and may obtain semantic information of different layers. According to action complexity degrees of the input operations of the user, processes for extracting an action feature have a great difference. If the terminal device cannot extract an identifiable action feature from the first input operation of the user, prompt information is generated and displayed, so as to notify the user that the input operation is invalid or is not identifiable.

Step 240: Display the action feature of the first input operation, and send confirmation prompt information to the user.

Specifically, after extracting the action feature of the first input operation, to avoid an identification error, the terminal device needs to perform confirmation with the user. Therefore, the terminal device displays the extracted action feature of the first input operation and sends the confirmation prompt information to the user.

Step 250: Receive confirmation information from the user.

Specifically, the user confirms the prompt information displayed on the terminal device. When the action feature displayed by the prompt information is consistent with the input of the user, the user performs a corresponding input operation on the terminal device, and the terminal device receives confirmation information from the user for the prompt information.

Step 260: Preset, in the instruction library, a correspondence between the action feature of the first input operation and a protection mode.

Specifically, after receiving the confirmation information, the terminal device stores the correspondence between the action feature extracted in the foregoing step and the privacy protection mode into the instruction library. When identifying a corresponding action feature again in a use process, the terminal device automatically enters the privacy protection mode.

To further ensure security of private information in the protection mode, password protection may be further added to the input configuration setting instruction. In this way, except a home user of the mobile terminal, other users have no permission to configure the instruction library.

Figure 3:
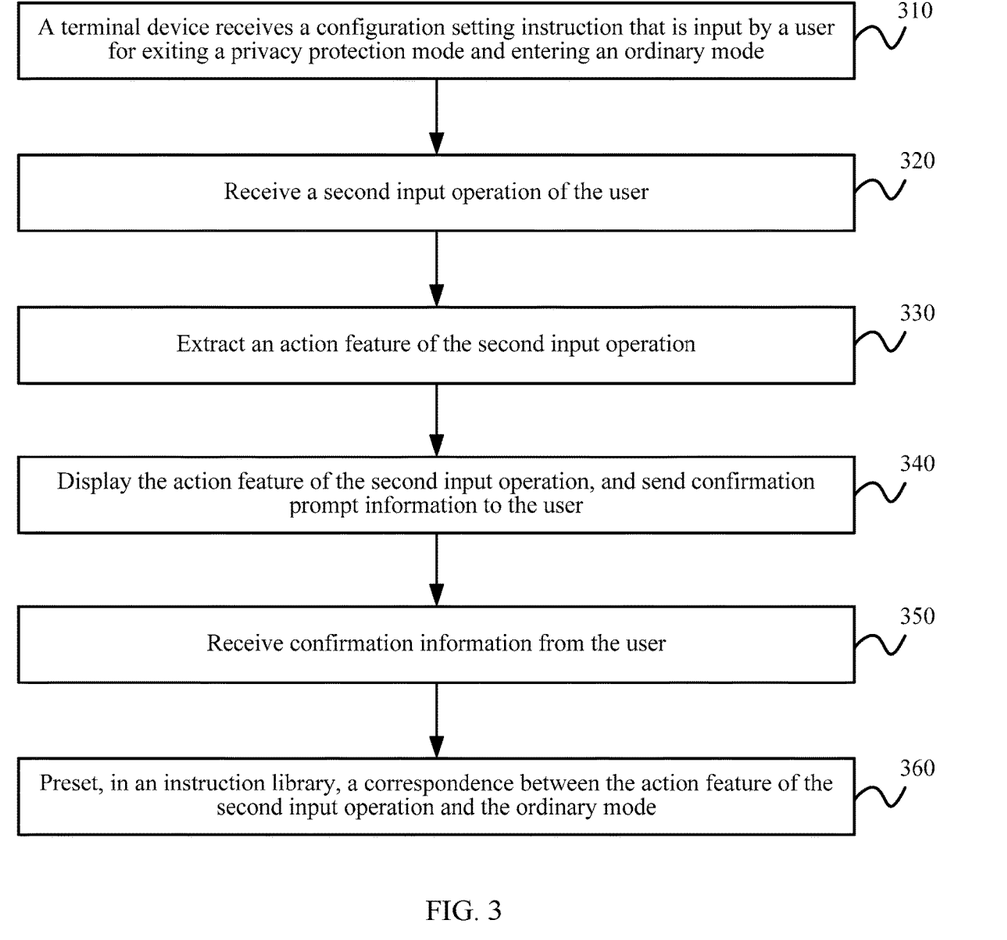
FIG. 3 is a flowchart of another instruction library presetting method according to an embodiment of the present invention.

The foregoing process is used to preset the correspondence between the action feature and the privacy protection mode in the instruction library. Certainly, a configuration process of the instruction library further includes a process of presetting, in a feature library, instruction information of entering an ordinary mode. As shown in FIG. 3, a specific method includes the following steps:

Step 310: The terminal device receives a configuration setting instruction that is input by the user for entering an ordinary mode.

Step 320: Receive a second input operation of the user.

Step 330: Extract an action feature of the second input operation.

Step 340: Display the action feature of the second input operation, and send confirmation prompt information to the user.

Step 350: Receive confirmation information from the user.

Step 360: Preset, in the instruction library, a correspondence between the action feature of the second input operation and the ordinary mode.

The specific execution process of the foregoing step 310 to step 360 is the same as that of the foregoing step 210 to step 260, and the processes only differ in triggering conditions and stored objects. The specific execution processes are not described herein again.

In addition, as can be known according to Embodiment 1, the application of the terminal device sends a subscription request to the privacy management service to subscribe to a notification, and determines, according to the notification sent by the privacy management service, to hide or display, on the terminal device, content whose privacy attribute is set to privacy protection in the application. Therefore, the application of the terminal device supports a function of managing privacy information, and may autonomously define or define, by means of user setting, a correspondence between information inside the application and the protection mode of the terminal.

Figure 4:
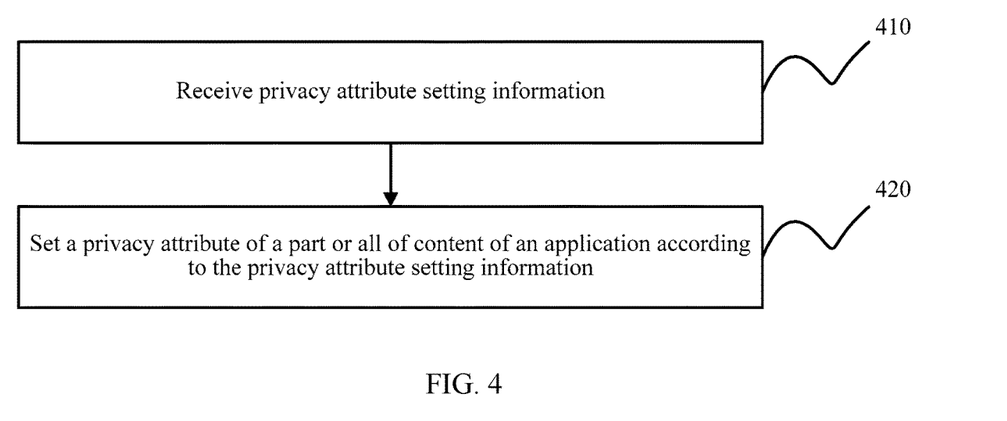
FIG. 4 is a flowchart of a method for setting a correspondence between information in an application and a protection mode of a terminal according to an embodiment of the present invention.

A process of the defining, by means of user setting, a correspondence between information inside the application and the protection mode of the terminal may be implemented by using a method provided in the following embodiment, and the method is specifically shown in FIG. 4.

Step 410: Receive a privacy attribute setting instruction.

Step 420: Set a privacy attribute of a part or all of content of the application according to the privacy attribute setting instruction.

In a specific example, for example, in an address book application, contact information is private information. A privacy attribute needs to be set for a contact, where the attribute indicates a correspondence between the contact information and the protection mode. If a user sets a privacy attribute of a particular contact to "privacy protection", information about the contact is hidden when the terminal device is in a privacy protection mode; if the privacy attribute is set to "non-privacy protection", the information about the contact is visible when the terminal device is in both a privacy protection mode and an ordinary mode.

In another specific example, for example, in an album application, gallery information is private information, and the application autonomously and initially sets the information as "non-privacy protection". When the user changes the protection mode of the terminal device to the privacy protection mode, although the album application receives a notification, display content of the album application does not change in the privacy protection mode. However, when the user sets a privacy attribute of a particular gallery among multiple galleries of the album to "privacy protection", the gallery is hidden in the privacy protection mode.

In another specific example, for example, in a calendar application, all information in the application is private information, and is initially set as "privacy protection". When the terminal device is in the privacy protection mode, whenever the user starts the calendar application, all the information in the application is hidden.

Further, an encryption storage mechanism may be used for private information in the application, which can better protect user privacy.

Figure 5:
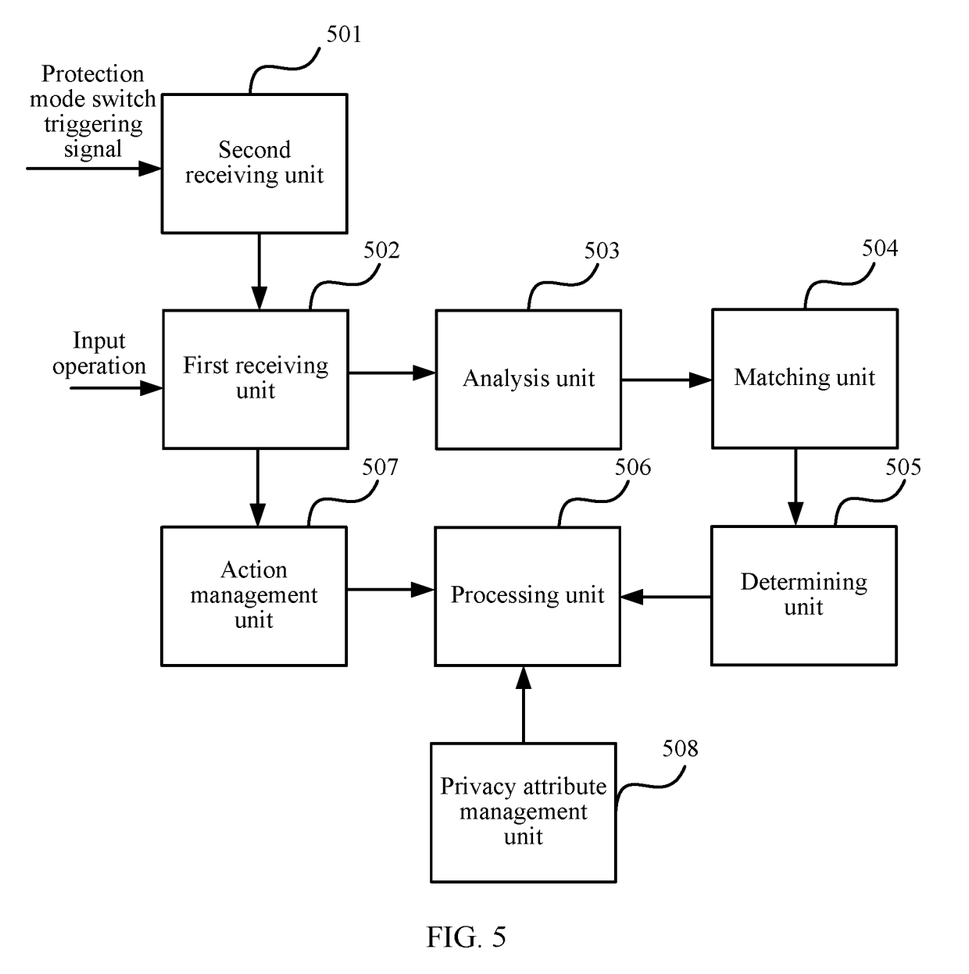
FIG. 5 is a schematic diagram of a terminal device according to an embodiment of the present invention.

Correspondingly, the present invention provides a mode switching apparatus, to implement the privacy protection method provided in the foregoing embodiment. As shown in FIG. 5, the apparatus includes: a first receiving unit 502, an analysis unit 503, a matching unit 504, a determining unit 505, and a processing unit 506, where the first receiving unit 502 is configured to receive an input operation of a user, where the input operation may include: an operation of changing a position or an angle of a terminal device, an operation of changing a posture or force for holding a terminal device, an operation of enabling a terminal device to receive a specific voice or image, or the like;

the analysis unit 503 is configured to identify the input operation received by the first receiving unit 502 and extract an action feature;

the matching unit 504 is configured to perform matching in an instruction library according to the action feature extracted by the analysis unit 503, and when the matching succeeds, obtain instruction information corresponding to the action feature, where the instruction information is specifically instruction information of entering a privacy protection mode or instruction information of entering an ordinary mode;

the determining unit 505 is configured to determine a protection mode of the apparatus according to the instruction information, and determine an application that subscribes to the protection mode in the apparatus; and the processing unit 506 is configured to control display of the application according to the protection mode of the apparatus.

Further, the instruction information includes: instruction information of entering a privacy protection mode or instruction information of entering an ordinary mode; and the apparatus further includes: an action management unit 507 and a privacy attribute management unit 508, where the action management unit 507 is configured to preset, in the instruction library, a correspondence between the action feature and the instruction information of entering a privacy protection mode, or preset, in the instruction library, a correspondence between the action feature and the instruction information of entering an ordinary mode; and the privacy attribute management unit 508 is configured to receive a privacy attribute setting instruction, and set a privacy attribute of a part or all of content in the application according to the privacy attribute setting instruction.

Optionally, the apparatus further includes: a second receiving unit 501, configured to receive a protection mode switch triggering signal input by the user, and start a second unit 502 to listen to the input operation of the user.

In addition, the processing unit 506 is further configured to: when the matching succeeds, generate, by the processing unit 506, prompt information, where the prompt information is used to prompt the user that the identification on the input operation by the apparatus succeeds and the apparatus will perform a protection mode switch.

In the terminal device provided in this embodiment of the present invention, a user can conveniently switch the terminal device between a protection mode and an ordinary mode, and the terminal device autonomously notifies, according to the switched protection mode, an application to select to hide or display content having a privacy attribute in the application on the terminal device, so that the user can conveniently select the protection mode of the terminal device in different use environments, to perform privacy protection.

Figure 6:
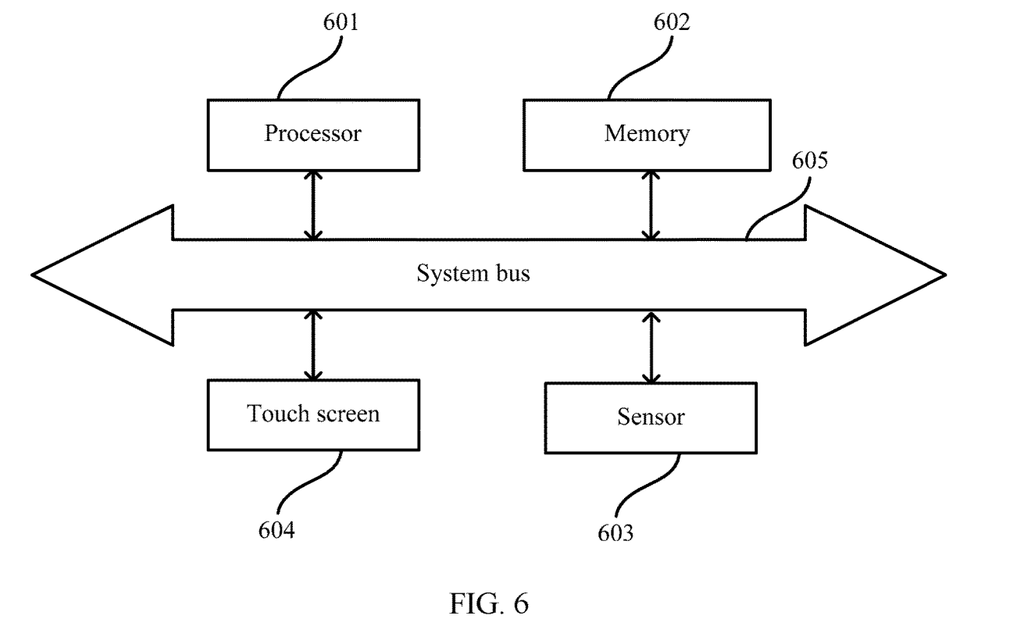
FIG. 6 is a schematic diagram of an entity apparatus of a terminal device according to an embodiment of the present invention.

Correspondingly, an embodiment of the present invention further provides a specific implementation manner of a terminal device. As shown in FIG. 6, the terminal device includes a processor 601, a memory 602, a sensor 603, a touch screen 604, and a system bus 605.

The system bus 605 is configured to connect the processor 601, the memory 602, the sensor 603, and the touch screen 604.

The processor 601 is configured to load an operating system, a privacy management service, and an application, where the privacy management service exists in a form of a system service or an application, and runs on the operating system; and the application includes an application that subscribes to the privacy management service. The processor 601 is configured to execute an instruction and complete operations related to a terminal device system, and may control receiving and sending of data that is input/output by components of the terminal device. The processor 601 may be implemented on a single chip, multiple chips, or multiple electronic elements, and may use multiple system structures, including a dedicated or an embedded processor, a dedicated processor, a controller, an application specific integrated circuit (Application Specific Integrated Circuit, ASIC), and the like.

The memory 602 includes persistent storage and non-persistent storage, where the former one may be a hard disk, an SD card, or the like, and is configured to store an operating system, a browser engine, a management module client, a user identification module, and other applications; and the latter may be an internal memory. When a program runs, the program needs to be loaded from the persistent storage to the internal memory, and the internal memory also stores temporary data that is generated when the program runs.

The sensor 603 is configured to collect moving states of the terminal device and environment information surrounding the terminal device. For example, the sensor may include: a gravity sensor, an acceleration sensor, a ray sensor, an image sensor, an audio sensor, and the like.

The touch screen 604 is configured for human-computer interaction. By means of the touch screen 604, the user may send a control instruction to the terminal device, and the user may receive a processing result and display information of the terminal device.

When the terminal device performs privacy protection, the sensor 603 receives an input operation of the user, where the input operation includes: an operation of changing a position or an angle of a terminal device, an operation of changing a posture or force for holding a terminal device, an operation of enabling a terminal device to receive a specific voice or image, or the like. The processor 601 identifies the input operation and extracts an action feature, and the action feature is stored in the memory 602. Then, the processor 601 performs matching in an instruction library according to the extracted action feature; when the matching succeeds, obtains instruction information corresponding to the action feature; determines a protection mode of the terminal device according to the instruction information; determines an application that subscribes to the protection mode in the terminal device; and controls display of the application on the touch screen 604 according to the protection mode of the terminal device.

Specifically, the instruction information includes: instruction information of entering a privacy protection mode or instruction information of entering an ordinary mode; the application further includes an instruction that can be used to enable the processor to execute the following process before the sensor 603 receives the input operation of the user:

presetting, in the instruction library, a correspondence between the action feature and the instruction information of entering a privacy protection mode, or presetting, in the instruction library, a correspondence between the action feature and the instruction information of entering an ordinary mode.

Further, an instruction, which can be used to preset, in the instruction library, a correspondence between the action feature and the instruction information of entering a privacy protection mode, in the application is:

receiving, by the terminal device by means of the touch screen 604 or the sensor 603, a configuration setting instruction that is input by the user for entering a protection mode;

receiving a first input operation of the user by means of the sensor 603;

extracting, by the processor 601, an action feature of the first input operation;

displaying the action feature of the first input operation by means of the touch screen 604, and sending confirmation prompt information to the user;

receiving, by the processor 601, confirmation information from the user; and presetting, in the instruction library, a correspondence between the action feature of the first input operation and the protection mode, and storing the correspondence in the memory 602.

Further, an instruction, which can be used to preset, in the instruction library, a correspondence between the action feature and the instruction information of entering an ordinary mode, in the application is:

receiving, by the terminal device by means of the touch screen 604 or the sensor 603, a configuration setting instruction that is input by the user for entering an ordinary mode;

receiving a second input operation of the user by means of the sensor 603;

extracting, by the processor 601, an action feature of the second input operation;

displaying the action feature of the second input operation by means of the touch screen 604, and sending confirmation prompt information to the user;

receiving, by the processor 601, confirmation information from the user; and presetting, in the instruction library, a correspondence between the action feature of the second input operation and the ordinary mode, and storing the correspondence in the memory 602.

Further, the application further includes an instruction that can be used to enable the processor to execute the following process before the input operation of the user is received:

receiving, by means of the touch screen 604, a protection mode switch triggering instruction input by the user, and starting monitoring the input operation of the user.

Further, the application further includes an instruction that can be used to enable the processor to execute the following process:

receiving a privacy attribute setting instruction by means of the touch screen 604; and setting, by the processing unit 601, a privacy attribute of a part or all of content of the application according to the privacy attribute setting instruction.

Further, an instruction, which can be used to control display of the application according to the protection mode of the terminal device, in the application is:

hiding or displaying, on the touch screen 604 of the terminal device according to the protection mode of the terminal device, the part or all of the content in the application, where the privacy attribute of the part or all of the content is already set.

Further, the application further includes an instruction that can be used to enable the processor to execute the following process:

when the matching succeeds, generating, by the processor 601, prompt information, where the prompt information is used to prompt, by means of the touch screen 604, the user that the terminal device successfully identifies the input operation and will switch to a protection mode.

The terminal device may further include: other components such as a power supply, a network interface, or a radio frequency circuit. The other components are not shown in FIG. 6, and may be added according to actual conditions.

In the terminal device in this embodiment of the present invention, a user conveniently switches the terminal device between a protection mode and an ordinary mode, and an application is notified, according to the switched protection mode of the terminal device, to select to hide or display content having a privacy attribute in the application on the terminal device, so that the user can conveniently select the protection mode of the terminal device in different use environments, to perform privacy protection.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A display method for a terminal having an operating system, a first application and a second application, wherein each of the first application and the second application provide to a user access to content, wherein the method comprises:
   accessing a first mode in response to a first input of the user;
   launching the first application in response to a first selection operation of the user;
   displaying both of a first part of content of the first application and a second part of the content of the first application when the first application is launched in response to the first selection operation of the user;
   accessing a second mode in response to a second input of the user;
   launching the first application in response to a second selection operation of the user; and
   displaying only the first part of the content of the first application and not displaying the second part of the content of the first application when the first application is launched in response to the second selection operation of the user;
   wherein the second part of the content of the first application is preset to be hidden in the second mode;
   detecting a third input of the user for switching from the first mode to the second mode;
   switching from the first mode to the second mode after an authorization succeeds;
   sending a first notification from a notification service of the operating system to the first application indicating that the first mode has switched to the second mode and not sending the first notification to the second application, wherein the first notification comprises a first identifier corresponding to the second mode;
   wherein the first application is subscribed to the notification service, and an identifier of the first application is carried in a request to the operating system for subscribing to the notification service such that the first application receives the first notification; and
   wherein the second application is not subscribed to the notification service, such that the second application does not receive the first notification.

2. The method according to claim 1, wherein the method further comprises:
   predetermining a correspondence between an input and an instruction of accessing the first mode or the second mode.

3. The method according to claim 2, wherein the predetermining a correspondence between an input and an instruction of accessing the first mode comprises:
   receiving, by the terminal device, a configuration setting instruction that is input by the user for accessing the first mode;
   detecting an input of the user;
   displaying the-input and sending confirmation prompt information to the user;
   receiving confirmation information from the user; and
   predetermining the correspondence between the input and the first mode.

4. The method according to claim 2, wherein the predetermining a correspondence between an input and an instruction of accessing the second mode comprises:
   receiving, by the terminal device, a configuration setting instruction that is input by the user for accessing the second mode;
   detecting an input of the user;
   displaying the input and sending confirmation prompt information to the user;
   receiving confirmation information from the user; and
   predetermining the correspondence between the input and the second mode.

5. The method according to claim 1, wherein the method further comprises:
   receiving a mode switch triggering instruction input by the user, and starting monitoring input of the user.

6. The method according to claim 1, wherein the first application comprises an address book application and wherein the content of the first application comprises a plurality of contacts, and wherein at least one of the plurality of the contacts is preset to be hidden in the second mode.

7. The method according to claim 6, wherein the method comprises:
   displaying the address book application and displaying the plurality of the contacts when the address book application is launched in the first mode, and displaying the address book application and not displaying the at least one of the plurality of the contacts when the address book application is launched in the second mode.

8. A terminal device comprising:
   a processor;
   a memory comprising an operating system, a first application and a second application, wherein each of the first application and the second application provide to a user access to content; and
   a display;
   wherein the memory comprises program code that when executed by the processor, causes the terminal device to perform, at least, the following:
   accessing a first mode in response to a first input of the user;
   launching the first application in response to a first selection operation of the user;
   displaying both of a first part of content of the first application and a second part of the content of the first application when the first application is launched in response to the first selection operation of the user;
   accessing a second mode in response to a second input of the user;
   launching the first application in response to a second selection operation of the user; and
   displaying only the first part of the content of the first application and not displaying the second part of the content of the first application when the first application is launched in response to the second selection operation of the user;
   wherein the second part of the content of the first application is preset to be hidden in the second mode;
   detecting a third input of the user for switching from the first mode to the second mode;
   switching from the first mode to the second mode after an authorization succeeds;
   sending a first notification from a notification service of the operating system to the first application indicating that the first mode has switched to the second mode and not sending the first notification to the second application, wherein the first notification comprises a first identifier corresponding to the second mode;

wherein the first application is subscribed to the notification service, and an identifier of the first application is carried in a request to the operating system for subscribing to the notification service such that the first application receives the first notification; and wherein the second application is not subscribed to the notification service, such that the second application does not receive the first notification.

9. The terminal according to claim 8, wherein the program code that when executed by the processor, further causes the terminal to perform:
predetermining a correspondence between an input and an instruction of accessing the first mode or the second mode before the processor detects the input of the user.

10. The terminal according to claim 9, wherein the program code that when executed by the processor, further causes the terminal to perform the following for predetermining a correspondence between an input and an instruction of accessing the first mode:
receiving a configuration setting instruction that is input by the user for accessing the first mode;
detecting an input of the user;
displaying the input and send confirmation prompt information to the user;
receiving confirmation information from the user; and
predetermining the correspondence between the input and the first mode.

11. The terminal according to claim 9, wherein the program code that when executed by the processor, further causes the terminal to perform the following for predetermining a correspondence between an input and an instruction of accessing the second mode:
receiving a configuration setting instruction that is input by the user for accessing the second mode;
detecting an input of the user;
displaying the input and send confirmation prompt information to the user;
receiving confirmation information from the user; and
predetermining the correspondence between the input and the second mode.

12. The terminal according to claim 8, wherein the program code that when executed by the processor, further causes the terminal to perform:
receiving a mode switch triggering instruction input by the user and start monitoring the input of the user before the processor detects the input of the user.

13. The terminal according to claim 8, wherein the first application comprises an address book application and the content of the first application comprises a plurality of contacts, and wherein at least one of the plurality of the contacts is preset to be hidden in the second mode.

14. The terminal according to claim 13, wherein the program code that when executed by the processor, further causes the terminal to perform:
displaying the address book application and displaying the plurality of the contacts when the address book application is launched in the first mode, and displaying the address book application and not displaying the at least one of the plurality of the contacts when the address book application is launched in the second mode.

15. The method according to claim 1, further comprising:
detecting a fourth input of the user for switching the second mode to the first mode;
switching the second mode to the first mode in response to detecting the fourth input; and sending a second notification from the notification service to the first application indicating that the second mode has switched to the first mode and not sending the second notification to the second application based on a determination that the first application is subscribed to the notification service and the second application is not subscribed to the notification service, wherein the second notification comprises a second identifier corresponding to the first mode.

16. The terminal device according to claim 8, wherein the program code that when executed by the processor, further causes the terminal to perform the following:
detecting a fourth input of the user for switching the second mode to the first mode;
switching the second mode to the first mode in response to detecting the fourth input; and
sending a second notification from the notification service to the first application indicating that the second mode has switched to the first mode and not sending the second notification to the second application based on a determination that the first application is subscribed to the notification service and the second application is not subscribed to the notification service, wherein the second notification comprises a second identifier corresponding to the first mode.

17. A display method for a terminal having an operating system, a first application and a second application, wherein each of the first application and the second application provide to a user access to content, wherein the method comprises:
accessing a first mode in response to a first input of a user;
launching the first application in response to a first selection operation of the user;
displaying both of a first part of content of the first application and a second part of the content of the first application when the first application is launched in response to the first selection operation of the user;
accessing a second mode in response to a second input of the user;
launching the first application in response to a second selection operation of the user; and
displaying only the first part of the content of the first application and not displaying the second part of the content of the first application when the first application is launched in response to the second selection operation of the user;
wherein the second part of the content of the first application is preset to be hidden in the second mode;
detecting a third input of the user for switching the second mode to the first mode;
switching the second mode to the first mode in response to detecting the third input;
sending a first notification from a notification service of the operating system to the first application indicating that the second mode has switched to the first mode and not sending the first notification to the second application, wherein the first notification comprises a first identifier corresponding to the first mode;
wherein the first application is subscribed to the notification service, and an identifier of the first application is carried in a request to the operating system for subscribing to the notification service such that the first application receives the first notification; and wherein the second application is not subscribed to the notification service, such that the second application does not receive the first notification.

18. The method according to claim 17, further comprising:
- detecting a fourth input of the user for switching the first mode to the second mode;
- switching the first mode to the second mode after an authorization succeeds; and
    - sending a second notification from the notification service to the first application indicating that the first mode has switched to the second mode and not sending the second notification to the second application based on a determination that the first application is subscribed to the notification service and the second application is not subscribed to the notification service, wherein the second notification comprises a second identifier corresponding to the second mode.

\* \* \* \* \*